(12) United States Patent
Hattori et al.

(10) Patent No.: US 10,601,094 B2
(45) Date of Patent: Mar. 24, 2020

(54) SEPARATOR-EQUIPPED AIR ELECTRODE FOR AIR-METAL BATTERY

(71) Applicant: NGK INSULATORS, LTD., Nagoya-Shi (JP)

(72) Inventors: Tatsuya Hattori, Nagoya (JP); Yoshihiko Yamamura, Nagoya (JP); Naohito Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 332 days.

(21) Appl. No.: 15/386,184

(22) Filed: Dec. 21, 2016

(65) Prior Publication Data

US 2017/0104254 A1    Apr. 13, 2017

Related U.S. Application Data

(63) Continuation of application No. PCT/JP2015/061029, filed on Apr. 8, 2015.

(30) Foreign Application Priority Data

Jul. 9, 2014    (JP) ................. 2014-141087

(51) Int. Cl.
*H01M 12/08* (2006.01)
*H01M 2/16* (2006.01)
(Continued)

(52) U.S. Cl.
CPC ........... *H01M 12/08* (2013.01); *H01M 2/168* (2013.01); *H01M 8/1018* (2013.01);
(Continued)

(58) Field of Classification Search
CPC ............................ H01M 2/1673; H01M 2/168
See application file for complete search history.

(56) References Cited

U.S. PATENT DOCUMENTS

2010/0291470 A1 * 11/2010 Sadasue .................. C08J 5/2243
                                                         429/483
2010/0323249 A1    12/2010 Fujiwara et al.
(Continued)

FOREIGN PATENT DOCUMENTS

JP    2010-146851 A1    7/2010
JP        5158150 B2    3/2013
(Continued)

OTHER PUBLICATIONS

Machine Translation of WO 2010109670 A1, provided by WIPO (Year: 2010).*
(Continued)

*Primary Examiner* — Robert S Carrico
(74) *Attorney, Agent, or Firm* — Burr & Brown, PLLC

(57) ABSTRACT

Provided is a separator-equipped air electrode for a metal-air battery, the separator-equipped air electrode including a separator composed of a hydroxide-ion-conductive inorganic solid electrolyte being a dense ceramic material; an air electrode layer containing an air electrode catalyst and an electron-conductive material, or containing an air electrode catalyst also serving as an electron-conductive material; and an intermediate layer disposed between the separator and the air electrode layer, improving the adhesion between the separator and the air electrode layer, and exhibiting hydroxide ion conductivity. The present invention enables an air electrode provided with a dense ceramic separator to ensure the desired characteristics of the dense ceramic separator and reduces the resistance of a metal-air battery (in particular, the interfacial resistance between the air electrode layer and the separator).

12 Claims, 2 Drawing Sheets

(51) Int. Cl.
  *H01M 8/1018* (2016.01)
  *H01M 8/1246* (2016.01)
  *H01M 4/90* (2006.01)
  *H01M 4/92* (2006.01)
  *H01M 8/124* (2016.01)

(52) U.S. Cl.
  CPC ............ *H01M 8/1246* (2013.01); *H01M 4/90* (2013.01); *H01M 4/92* (2013.01); *H01M 2008/1095* (2013.01); *H01M 2008/1293* (2013.01); *H01M 2300/0065* (2013.01); *H01M 2300/0071* (2013.01); *H01M 2300/0082* (2013.01); *H01M 2300/0094* (2013.01); *Y02E 60/128* (2013.01)

(56) References Cited

U.S. PATENT DOCUMENTS

| | | |
|---|---|---|
| 2012/0028136 A1 | 2/2012 | Sato et al. |
| 2012/0328971 A1 | 12/2012 | Matsuda et al. |
| 2013/0017432 A1 | 1/2013 | Roumi |
| 2013/0143132 A1 | 6/2013 | Mizuno |
| 2013/0273442 A1 | 10/2013 | Ogumi et al. |
| 2014/0205917 A1 | 7/2014 | Mizuno |
| 2014/0227616 A1 | 8/2014 | Yamada et al. |
| 2015/0024292 A1 | 1/2015 | Yamada et al. |

FOREIGN PATENT DOCUMENTS

| | | |
|---|---|---|
| JP | 5207407 B2 | 6/2013 |
| JP | 5221626 B2 | 6/2013 |
| JP | 2013-201056 A1 | 10/2013 |
| WO | 2010/104043 A1 | 9/2010 |
| WO | 2010/109670 A1 | 9/2010 |
| WO | 2011/108526 A1 | 9/2011 |
| WO | 2013/046403 A1 | 4/2013 |
| WO | 2013/073292 A1 | 5/2013 |
| WO | 2013/161516 A1 | 10/2013 |

OTHER PUBLICATIONS

Extended European Search Report, European Application No. 15818827.6, dated Nov. 9, 2017 (8 pages).

Dewi, et al. "Cationic polysulfonium membrane as a separator in zinc-air cell," *Journal of Power Sources*, vol. 115, No. 1, dated Mar. 27, 2003, pp. 149-152 (4 pages).

International Search Report and Written Opinion (Application No. PCT/JP2015/061029) dated Jul. 7, 2015 (with English translation).

* cited by examiner

SEPARATOR-EQUIPPED AIR ELECTRODE FOR AIR-METAL BATTERY

CROSS-REFERENCE TO RELATED APPLICATIONS

This application is a continuation application of PCT/JP2015/061029 filed Apr. 8, 2015, which claims priority to Japanese Patent Application No. 2014-141087 filed Jul. 9, 2014, the entire contents all of which are incorporated herein by reference.

BACKGROUND OF THE INVENTION

1. Field of the Invention

The present invention relates to a separator-equipped air electrode for a metal-air battery.

2. Description of the Related Art

One candidate of innovative batteries is a metal-air battery. In a metal-air battery, which is fed with oxygen (i.e., a positive-electrode active material) from air, the space in a battery container can be maximally filled with a negative-electrode active material. Thus, the metal-air battery can achieve high energy density in principle.

For example, a zinc-air battery, which contains zinc as a negative-electrode active material, includes an alkaline electrolytic solution (i.e., an aqueous solution of an alkali, such as potassium hydroxide) and a separator for preventing the short circuit between the positive and negative electrodes. During a discharge mode of the battery, $O_2$ is reduced to generate $OH^-$ at the air electrode (positive electrode) and zinc is oxidized to generate ZnO at the negative electrode as illustrated in the following formulae:

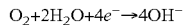    Positive electrode:

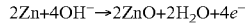    Negative electrode:

Several attempts have been made to use a zinc-air battery as a secondary battery. Unfortunately, the battery poses a problem in that the reduction of generated $Zn(OH)_4^{2-}$ (i.e., an ionic species soluble in the electrolytic solution) forms zinc dendritic crystals (i.e., dendrites) during a charge mode, and the dendrites penetrate the separator to cause the short circuit between the negative electrode and the positive electrode. The battery also poses a problem in that carbon dioxide contained in air permeates the air electrode and dissolves in the electrolytic solution, and the resultant carbonate ions cause the degradation of the electrolytic solution. In order to solve such problems, Patent Document 1 (WO2013/073292) discloses a zinc-air secondary battery including a separator composed of a hydroxide-ion-conductive inorganic solid electrolyte, wherein the inorganic solid electrolyte is disposed on one surface of an air electrode, and the inorganic solid electrolyte is a hydrothermally solidified dense layered double hydroxide (LDH) represented by the formula: $M^{2+}_{1-x}M^{3+}_x(OH)_2A^{n-}_{x/n} \cdot mH_2O$ (where $M^{2+}$ represents a divalent cation, $M^{3+}$ represents a trivalent cation, and $A^{n-}$ represents an n-valent anion). The air electrode, which is disposed on the inorganic solid electrolyte (separator), is composed of a particulate catalyst, such as platinum, and a particulate electrically conductive material, such as carbon material.

The aforementioned problems may occur in a lithium-air secondary battery. In connection therewith, Patent Document 2 (WO2013/161516) discloses a lithium-air secondary battery including an anion exchanger composed of a hydroxide-ion-conductive inorganic solid electrolyte, wherein the inorganic solid electrolyte is disposed on one surface of an air electrode, and the inorganic solid electrolyte is a hydrothermally solidified dense layered double hydroxide (LDH). The air electrode, which is disposed on the inorganic solid electrolyte (anion exchanger), is composed of a particulate catalyst, such as platinum, and a particulate electrically conductive material, such as carbon material.

Various air electrodes have been proposed for improving the performances of metal-air batteries. For example, Patent Document 3 (JP5207407B) discloses an air electrode having a layered structure including a polymeric anion-exchange membrane and an air electrode catalyst layer containing an anion-exchange resin, and describes that the air electrode maintains high hydroxide ion conductivity. Patent Document 4 (JP2013-201056A) discloses an air electrode catalyst layer containing a layered double hydroxide and a transition metal catalyst, and describes that an anion exchanger may be disposed on an electrolyte-side surface of the catalyst layer, and the anion exchanger may be an anion-conductive electrolyte membrane containing a layered double hydroxide (in particular, a coating membrane prepared with a dispersion). Patent Document 5 (JP5158150B) discloses an air electrode for a metal-air battery, the air electrode containing an air electrode catalyst and an electrically conductive material, wherein the air electrode catalyst contains a layered double hydroxide. Patent Document 6 (JP5221626B) discloses an air electrode for a metal-air secondary battery, the air electrode containing an air electrode catalyst, an air electrode electrolyte, and an electrically conductive material, wherein the air electrode electrolyte contains a layered double hydroxide, and the amount of the layered double hydroxide is 10 to 20 mass % relative to the total mass (taken as 100 mass %) of the air electrode catalyst and the layered double hydroxide. Each of the air electrodes disclosed in Patent Documents 3 to 6, however, does not include a separator composed of a dense ceramic material, such as a hydrothermally solidified layered double hydroxide (LDH) disclosed in Patent Document 1.

CITATION LIST

Patent Documents

Patent Document 1: WO2013/073292
Patent Document 2: WO2013/161516
Patent Document 3: JP5207407B
Patent Document 4: JP2013-201056A
Patent Document 5: JP5158150B
Patent Document 6: JP5221626B
Patent Document 7: WO2011/108526

SUMMARY OF THE INVENTION

The present inventors have found that interposing a certain intermediate layer between an air electrode layer and a separator composed of a hydroxide-ion-conductive inorganic solid electrolyte being a dense ceramic material can reduce the resistance of a metal-air battery (in particular, the interfacial resistance between the air electrode layer and the separator) while ensuring the desired characteristics of the dense ceramic separator.

An object of the present invention is to enable an air electrode provided with a dense ceramic separator to ensure the desired characteristics of the dense ceramic separator and to reduce the resistance of a metal-air battery (in particular, the interfacial resistance between the separator and an air electrode layer).

An aspect of the present invention provides a separator-equipped air electrode for a metal-air battery, the separator-equipped air electrode comprising:

a separator comprising a hydroxide-ion-conductive inorganic solid electrolyte being a dense ceramic material;

an air electrode layer disposed above the separator, the air electrode layer comprising an air electrode catalyst and an electron-conductive material, or comprising an air electrode catalyst also serving as an electron-conductive material; and an intermediate layer disposed between the separator and the air electrode layer, improving the adhesion between the separator and the air electrode layer, and exhibiting hydroxide ion conductivity.

Another aspect of the present invention provides a metal-air battery comprising the separator-equipped air electrode of the present invention, a negative electrode comprising a metal, an alloy, and/or a metal compound, and an electrolytic solution, wherein the electrolytic solution is separated from the air electrode layer by the separator of the air electrode.

DETAILED DESCRIPTION OF THE INVENTION

Separator-Equipped Air Electrode

The separator-equipped air electrode of the present invention is used for a metal-air battery, in particular, a metal-air secondary battery. A metal-air battery for which the air electrode of the present invention is to be used typically includes a hydroxide-ion-conductive separator, an air electrode layer disposed on one surface of the separator and serving as a positive electrode, a metal negative electrode disposed on the other surface of the separator, and an electrolytic solution provided between the air electrode layer and the negative electrode via the separator. The combination of the hydroxide-ion-conductive separator and the air electrode layer corresponds to the separator-equipped air electrode of the present invention. Thus, the separator-equipped air electrode of the present invention may be referred to as an air electrode-separator composite. Preferred examples of the metal-air secondary battery having the aforementioned configuration include the zinc-air secondary battery and the lithium-air secondary battery disclosed in Patent Documents 1 and 2.

Figure 1:
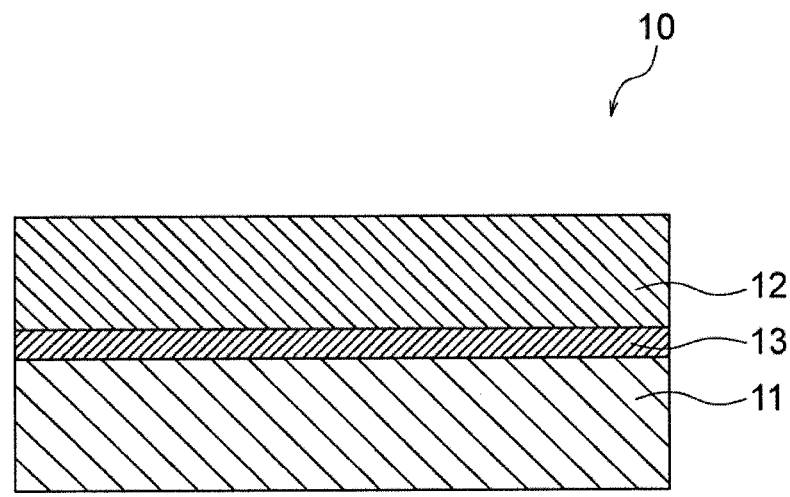
FIG. 1 is a schematic cross-sectional view of a separator-equipped air electrode of the present invention.

FIG. 1 is a schematic illustration of an exemplary separator-equipped air electrode of the present invention. As illustrated in FIG. 1, the separator-equipped air electrode 10 includes a separator 11, an air electrode layer 12 disposed on the separator 11, and an intermediate layer 13 disposed between the separator 11 and the air electrode layer 12. The separator 11 is composed of a hydroxide-ion-conductive inorganic solid electrolyte being a dense ceramic material. The air electrode layer 12 comprises an air electrode catalyst and an electron-conductive material, or comprises an air electrode catalyst also serving as an electron-conductive material. The intermediate layer 13 improves the adhesion between the separator 11 and the air electrode layer 12 and exhibits hydroxide ion conductivity. Thus, the intermediate layer 13 allows hydroxide ions generated at the air electrode layer 12 to pass selectively therethrough into the separator 11. The use of the separator composed of the hydroxide-ion-conductive inorganic solid electrolyte being a dense ceramic material can prevent the intrusion of carbon dioxide into the electrolytic solution because of high density of the separator, leading to prevention of the degradation of the electrolytic solution caused by generation of carbonate ions, resulting in avoidance of poor battery performance. The separator, which has high density and hardness, can also prevent the short circuit between the positive and negative electrodes caused by dendritic zinc during a charge mode of a zinc-air secondary battery. Thus, the resultant metal-air battery (in particular, metal-air secondary battery) exhibits high reliability while maintaining its performance. The presence of the intermediate layer 13 between the separator 11 and the air electrode layer 12 can improve the adhesion between the separator 11 and the air electrode layer 12, resulting in a reduction in interfacial resistance between the separator 11 and the air electrode layer 12. For example, a small gap (caused by, for example, exfoliation) between the separator 11 and the air electrode layer 12 could inhibit the conduction of hydroxide ions, resulting in an increase in resistance at a portion around the gap. In the separator-equipped air electrode 10 of the present invention, the intermediate layer 13 can contribute to hydroxide ion conduction between the separator 11 and the air electrode layer 12 and an improvement in adhesion therebetween, resulting in resolution or reduction of the aforementioned problems. Thus, the air electrode provided with the dense ceramic separator according to the present invention can reduce the resistance of the metal-air battery (in particular, the interfacial resistance between the air electrode layer and the separator) while ensuring the desired characteristics of the dense ceramic separator.

Air Electrode Layer

The air electrode layer 12 contains the air electrode catalyst, the electron-conductive material, and optionally a hydroxide-ion-conductive material. If the air electrode catalyst also serves as the electron-conductive material, the air electrode layer 12 may contain the air electrode catalyst also serving as the electron-conductive material and optionally the hydroxide-ion-conductive material.

The air electrode catalyst may be of any type that functions as a positive electrode in a metal-air battery and can utilize oxygen as a positive-electrode active material. Preferred examples of the air electrode catalyst include carbon materials having a redox catalytic function, such as graphite; metals having a redox catalytic function, such as platinum and nickel; and inorganic oxides having a redox catalytic function, such as perovskite oxides, manganese dioxide, nickel oxide, cobalt oxide, and spinel oxides. The air electrode catalyst may be in any form, but is preferably in a particulate form. The amount of the air electrode catalyst contained in the air electrode layer 12 is not particularly limited, but is preferably 5 to 70 vol. %, more preferably 5 to 60 vol. %, still more preferably 5 to 50 vol. %, relative to the total amount of the air electrode layer 12.

The electron-conductive material may be of any type having electrical conductivity and capable of conducting electrons between the air electrode catalyst and the separator 11. Preferred examples of the electron-conductive material include carbon black materials, such as Ketjen black, acetylene black, channel black, furnace black, lamp black, and thermal black; graphites, such as natural graphite (e.g., scaly graphite), artificial graphite, and expanded graphite; electrically conductive fibers, such as carbon fiber and metal fiber; powdery metals, such as copper, silver, nickel, and aluminum; organic electron-conductive materials, such as polyphenylene derivatives; and any mixture of these materials. The electron-conductive material may be in any form, such as a particulate form. The electron-conductive material is preferably used in a form that provides a continuous phase (i.e., an electron-conductive phase) in the air electrode layer 12 in the thickness direction. For example, the electron-conductive material may be a porous material. Alternatively, the electron-conductive material may be a mixture or composite material with the air electrode catalyst (e.g., in the form of platinum on carbon), or may be the aforementioned air electrode catalyst also serving as an electron-conductive material (e.g., a perovskite compound containing a transition metal). The amount of the electron-conductive material contained in the air electrode layer 12 is not particularly limited, but is preferably 10 to 80 vol. %, more preferably 15 to 80 vol. %, still more preferably 20 to 80 vol. %, relative to the total amount of the air electrode layer 12.

The air electrode layer 12 may further contain a hydroxide-ion-conductive material as an optional component. In such a case, the air electrode layer 12 containing the air electrode catalyst and the electron-conductive material (i.e., traditional components) and also containing a hydroxide-ion-conductive material is disposed on the hydroxide-ion-conductive intermediate layer 13, which is disposed on the separator 11 composed of the hydroxide-ion-conductive inorganic solid electrolyte being a dense ceramic material. This configuration can ensure the desired characteristics of the dense ceramic separator 11 and reduce the reaction resistance of the air electrode in the metal-air battery. If the air electrode layer 12 contains not only the air electrode catalyst and the electron-conductive material, but also a hydroxide-ion-conductive material, a three-phase interface composed of an electron-conductive phase (the electron-conductive material) and a gaseous phase (air) is present not only at the interface between the intermediate layer 13 and the air electrode layer 12, but also in the air electrode layer 12. This leads to effective hydroxide ion conduction contributing to the battery reaction over a large surface area, resulting in reduced reaction resistance of the air electrode in the metal-air battery.

The hydroxide-ion-conductive material may be any material through which hydroxide ions can permeate. The hydroxide-ion-conductive material may be any inorganic or organic material and may be in any form. The hydroxide-ion-conductive material may be in a particulate form, or may be in the form of a coating membrane that partially or substantially entirely covers the air electrode catalyst and the electron-conductive material. Preferably, the hydroxide-ion-conductive material in the form of a coating membrane is not dense and has pores through which $O_2$ and $H_2O$ can pass from the outer surface of the air electrode layer 12 toward the interface between the intermediate layer 13 and the separator 11. The amount of the hydroxide-ion-conductive material contained in the air electrode layer 12 is not particularly limited, but is preferably 0 to 95 vol. %, more preferably 5 to 85 vol. %, still more preferably 10 to 80 vol. %, relative to the total amount of the air electrode layer 12.

In a preferred embodiment of the present invention, the hydroxide-ion-conductive material comprises a layered double hydroxide having a fundamental composition represented by the formula: $M^{2+}_{1-x}M^{3+}_x(OH)_2A^{n-}_{x/n} \cdot mH_2O$ (where $M^{2+}$ represents at least one divalent cation, $M^{3+}$ represents at least one trivalent cation, $A^{n-}$ represents an n-valent anion, n is an integer of 1 or more, and x is 0.1 to 0.4). In the formula, $M^{2+}$ may represent any divalent cation, and is preferably $Ni^{2+}$, $Mg^{2+}$, $Ca^{2+}$, $Mn^{2+}$, $Fe^{2+}$, $Co^{2+}$, $Cu^{2+}$, or $Zn^{2+}$, more preferably $Ni^{2+}$. $M^{3+}$ may represent any trivalent cation, and is preferably $Fe^{3+}$, $Al^{3+}$, $Co^{3+}$, $Cr^{3+}$, or $In^{3+}$, more preferably $Fe^{3+}$. $A^{n-}$ may represent any anion, and is preferably $NO_3^-$, $CO_3^{2-}$, $SO_4^{2-}$, $OH^-$, $Cl^-$, $I^-$, $Br^-$, or $F^-$, more preferably $NO_3^-$ and/or $CO_3^{2-}$. In the formula, preferably, $M^{2+}$ comprises $Ni^{2+}$, $M^{3+}$ comprises $Fe^{3+}$, and $A^{n-}$ comprises $NO_3^-$ and/or $CO_3^{2-}$. In the formula, n is an integer of 1 or more, preferably 1 to 3; x is 0.1 to 0.4, preferably 0.2 to 0.35; and m is any real number. In another preferred embodiment of the present invention, the hydroxide-ion-conductive material may have at least one fundamental composition selected from the group consisting of hydrates of $NaCo_2O_4$, $LaFe_3Sr_3O_{10}$, $Bi_4Sr_{14}Fe_{24}O_{56}$, $NaLaTiO_4$, $RbLaNb_2O_7$, and $KLaNb_2O_7$ and $Sr_4Co_{1.6}Ti_{1.4}O_8(OH)_2 \cdot xH_2O$. These inorganic solid electrolytes are disclosed in Patent Document 7 (WO2011/108526) as hydroxide-ion-conductive solid electrolytes for fuel cells. Such a hydroxide-ion-conductive inorganic solid electrolyte can be prepared through reduction and hydration of a dense sintered compact having the aforementioned fundamental composition.

In another preferred embodiment of the present invention, the hydroxide-ion-conductive material may contain a polymer material having hydroxide ion conductivity, or may be a mixture or composite of such a polymer material and the aforementioned layered double hydroxide. The hydroxide-ion-conductive polymer material is preferably a polymer material having a hydroxide-ion-permeable anion-exchange group. Preferred examples of the hydroxide-ion-conductive polymer material include polymer compounds; for example, hydrocarbon resins having anion-exchange groups, such as quaternary ammonium, pyridinium, imidazolium, phosphonium, and sulfonium groups (e.g., polystyrene, polysulfones, polyethersulfone, poly(ether ether ketone), polyphenylene, polybenzimidazole, polyimide, and poly(arylene ether)) and fluororesins.

The air electrode layer 12 may be formed by any process, so long as the layer disposed on the intermediate layer 13 contains the air electrode catalyst, the electron-conductive material, and optionally the hydroxide-ion-conductive material. For example, the air electrode layer 12 may be formed through the following procedure: the air electrode catalyst, the electron-conductive material, and optionally the hydroxide-ion-conductive material are wet-mixed with a solvent (e.g., ethanol), followed by drying and pulverization, and the mixture is mixed with a binder and the resultant fibrillary mixture was press-bonded to a current collector. A laminate of the air electrode layer 12/the current collector may be press-bonded to the intermediate layer 13 so that the air electrode layer 12 comes into contact with the intermediate layer 13. Alternatively, the air electrode layer 12 may be formed through the following procedure: the air electrode catalyst, the electron-conductive material, and optionally the hydroxide-ion-conductive material are wet-mixed with a solvent (e.g., ethanol), and the resultant slurry is applied to the intermediate layer 13 and then dried.

Thus, the air electrode layer 12 may contain a binder. The binder may be a thermoplastic resin or a thermosetting resin. Preferred examples of the binder include polyethylene, polypropylene, polytetrafluoroethylene (PTFE), poly(vinylidene fluoride) (PVDF), styrene-butadiene rubbers (SBR), tetrafluoroethylene-hexafluoroethylene copolymers, tetrafluoroethylene-hexafluoropropylene copolymers (FEP), tetrafluoroethylene-perlluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers, (ECTFE), vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, carboxymethyl cellulose (CMC), methyl cellulose (MC), cellulose acetate phthalate (CAP), hydroxypropylmethyl cellulose (HPMC), hydroxypropylmethyl cellulose phthalate (HPMCP), poly(vinyl alcohol) (PVA), and mixtures of these resins.

In a preferred embodiment of the present invention, the amount by volume of the hydroxide-ion-conductive material contained in the air electrode layer 12 may increase stepwise or gradually from the outer surface of the air electrode layer 12 toward the interface between the air electrode layer 12 and the intermediate layer 13. With this configuration, a relatively small amount of the hydroxide-ion-conductive material leads to an increase in contact area between the air electrode catalyst and air at the outer surface of the air electrode layer 12, resulting in promotion of the catalytic reaction. Hydroxide ions generated by the catalytic reaction are efficiently conducted to the separator 11 through the intermediate layer 13 because of an increase in number of conduction paths from the outer surface of the air electrode layer 12 toward the interface between the air electrode layer 12 and the intermediate layer 13. The hydroxide-ion-conductive material may be in the form of particles or a coating membrane. Preferably, the hydroxide-ion-conductive material in the form of a coating membrane is not dense and has pores through which $O_2$ and $H_2O$ can pass from the outer surface of the air electrode layer 12 toward the interface between the air electrode layer 12 and the intermediate layer 13. The amount by volume of the hydroxide-ion-conductive material in the vicinity of the interface between the air electrode layer 12 and the intermediate layer 13 is preferably 1.2 times or more, 1.5 times or more, 2.0 times or more, 2.5 times or more, or 3.0 times or more that of the hydroxide-ion-conductive material in the vicinity of the outer surface of the air electrode layer 12. Preferably, the air electrode layer 12 includes a first air electrode sublayer having a relatively high content of the hydroxide-ion-conductive material and a second air electrode sublayer having a relatively low content of the hydroxide-ion-conductive material such that the first air electrode sublayer is in contact with the intermediate layer 13 and the second air electrode sublayer is exposed to external air. In this case, the amount by volume of the hydroxide-ion-conductive material contained in the first air electrode sublayer is preferably 1.2 times or more, 1.5 times or more, 2.0 times or more, 2.5 times or more, or 3.0 times or more that of the hydroxide-ion-conductive material contained in the second air electrode sublayer.

The air electrode layer 12 has a thickness of preferably 5 to 200 μm, more preferably 5 to 100 μm, still more preferably 5 to 50 μm, particularly preferably 5 to 30 μm. For example, in the case where the air electrode layer 12 contains the hydroxide-ion-conductive material, such a preferred thickness of the air electrode layer leads to a reduction in gas diffusion resistance and an increase in area of the three-phase interface, resulting in further reduced reaction resistance of the air electrode.

The separator-equipped air electrode 10 may include a positive-electrode current collector disposed on the surface of the air electrode layer 12. The positive-electrode current collector preferably has gas permeability so that air can be fed to the air electrode layer 12. Preferred examples of the positive-electrode current collector include plates and meshes of metals, such as stainless steel, copper, and nickel; carbon paper; carbon cloth; and electron-conductive oxides. Particularly preferred is stainless steel mesh in view of corrosion resistance and gas permeability.

Separator

The separator 11 is preferably composed of a hydroxide-ion-conductive inorganic solid electrolyte being a dense ceramic material capable of selective permeation of hydroxide ions generated at the air electrode layer 12 to the electrolytic solution. The separator 11 prevents the intrusion of an undesired substance contained in air (e.g., carbon dioxide) into the battery, and also prevents the migration of alkali metal ions contained in the electrolytic solution to the air electrode layer 12. Thus, the separator 11 is desirably composed of a material capable of preventing the permeation of carbon dioxide. For this reason, the separator 11 is composed of a hydroxide-ion-conductive inorganic solid electrolyte being a dense ceramic material. In particular, the separator 11 is preferably composed of a dense and hard inorganic solid electrolyte in view of preventing both the short circuit between the positive and negative electrodes caused by dendritic metal (e.g., dendritic zinc) and the intrusion of carbon dioxide. The hydroxide-ion-conductive inorganic solid electrolyte has a relative density of preferably 88% or more, more preferably 90% or more, still more preferably 94% or more, as determined by the Archimedes method. The density may be any value so long as the inorganic solid electrolyte can prevent the intrusion of an undesired substance contained in air (e.g., carbon dioxide) into the battery and the penetration of dendritic zinc. The hydroxide-ion-conductive inorganic solid electrolyte is preferably a layered double hydroxide (LDH) having a fundamental composition represented by the formula: $M^{2+}_{1-x}M^{3+}_{x}(OH)_2 A^{n-}_{x/n} \cdot mH_2O$ (where $M^{2+}$ represents at least one divalent cation, $M^{3+}$ represents at least one trivalent cation, $A^{n-}$ represents an n-valent anion, n is an integer of 1 or more, and x is 0.1 to 0.4). More preferably, $M^{2+}$ comprises $Mg^{2+}$, $M^{3+}$ comprises $Al^{3+}$, and $A^{n-}$ comprises $CO_3^{2-}$. Such a layered double hydroxide is preferably densified by a hydrothermal process. Thus, a green compact which has not undergone the hydrothermal process is not suitable as the separator 11 in the present invention because the compact is not dense and is brittle in the solution. Also, a coating membrane formed through application of a dispersion containing the layered double hydroxide is not suitable as the separator 11 in the present invention because of low density of the membrane. Any solidification process other than hydrothermal process may be used for producing a dense and hard hydroxide-ion-conductive solid electrolyte. As describe above, the separator 11 is preferably composed of a dense layered double hydroxide. A preferred dense layered double hydroxide and a process for preparation of the layered double hydroxide will be described below.

In another preferred embodiment of the present invention, the hydroxide-ion-conductive inorganic solid electrolyte may have at least one fundamental composition selected from the group consisting of hydrates of $NaCo_2O_4$, $LaFe_3Sr_3O_{10}$, $Bi_4Sr_{14}Fe_{24}O_{56}$, $NaLaTiO_4$, $RbLaNb_2O_7$, and $KLaNb_2O_7$ and $Sr_4Co_{1.6}Ti_{1.4}O_8(OH)_2 \cdot xH_2O$. These inorganic solid electrolytes are disclosed in Patent Document 7 (WO2011/108526) as hydroxide-ion-conductive solid electrolytes for fuel cells. Such a hydroxide-ion-conductive inorganic solid electrolyte can be prepared through reduction and hydration of a dense sintered compact having the aforementioned fundamental composition.

The separator 11 may be in any form; for example, in a dense plate or membrane form. The separator 11 is preferably in the form of a plate in view of further effective prevention of the penetration of dendritic metal, the intrusion of carbon dioxide, and the migration of alkali metal ions to the air electrode. The separator 11 is also preferably in the form of a membrane having a density enough to prevent the intrusion of carbon dioxide and the migration of alkali metal ions to the air electrode. The hydroxide-ion-conductive solid electrolyte in the form of a plate has a thickness of preferably 0.1 to 1 mm, more preferably 0.1 to 0.5 mm, still more preferably 0.1 to 0.2 mm. The hydroxide-ion-conductive solid electrolyte in the form of a membrane has a thickness of preferably 0.001 to 0.05 mm, more preferably 0.001 to 0.01 mm, still more preferably 0.001 to 0.005 mm. The hydroxide-ion-conductive solid electrolyte preferably has a high hydroxide ion conductivity. The solid electrolyte has a hydroxide ion conductivity of typically $1 \times 10^{-4}$ to $1 \times 10^{-1}$ S/m ($1 \times 10^{-3}$ to 1 mS/cm), more typically $1.0 \times 10^{-4}$ to $1.0 \times 10^{-2}$ S/m ($1.0 \times 10^{-3}$ to $1.0 \times 10^{1}$ mS/cm).

The separator 11 may be in the form of a composite body containing particles of an inorganic solid electrolyte having hydroxide ion conductivity and an auxiliary component that promotes the densification or hardening of the particles. Alternatively, the separator 11 may be in the form of a composite body containing a porous body serving as a substrate and an inorganic solid electrolyte (e.g., a layered double hydroxide) that is precipitated and grown in pores of the porous body. Examples of the materials of the porous body include ceramic materials, such as alumina and zirconia.

A porous substrate may be disposed on either or both of the surfaces of the separator 11 for reliable retention of hydroxide ions on the separator 11. The disposition of the porous substrate on one surface of the separator 11 probably involves a process including preparation of the porous substrate and formation of a membrane of the inorganic solid electrolyte on the porous substrate. In contrast, the disposition of the porous substrate on the two surfaces of the separator 11 probably involves a process including densification of the raw powder of the inorganic solid electrolyte disposed between two porous substrates. The porous substrate may be composed of a layered double hydroxide or a polymer having hydroxide ion conductivity.

Intermediate Layer

The intermediate layer 13, which is disposed between the separator 11 and the air electrode layer 12, improves the adhesion between the separator 11 and the air electrode layer 12 and exhibits hydroxide ion conductivity. The intermediate layer 13 may be composed of an organic or inorganic material and may have any known composition and structure that can improve the adhesion between the separator 11 and the air electrode layer 12 and exhibit hydroxide ion conductivity. The intermediate layer 13 preferably comprises a polymer material and/or a ceramic material. In such a case, at least one of the polymer and ceramic materials contained in the intermediate layer 13 may exhibit hydroxide ion conductivity.

In a preferred embodiment of the present invention, the intermediate layer 13 may comprise a polymer material having hydroxide ion conductivity. Such a polymer material preferably contains a solid polymer electrolyte having hydroxide ion conductivity. The intermediate layer 13 may comprise a mixture or composite of such a polymer material and a layered double hydroxide. The solid polymer electrolyte having hydroxide ion conductivity is preferably a polymer material having a hydroxide-ion-permeable anion-exchange group; for example, an ionomer resin. Examples of the ionomer resin include polymer compounds; for example, hydrocarbon resins having anion-exchange groups, such as quaternary ammonium, pyridinium, imidazolium, phosphonium, and sulfonium groups (e.g., polystyrene, polysulfones, polyethersulfone, poly(ether ether ketone), polyphenylene, polybenzimidazole, polyimide, and poly(arylene ether)) and fluororesins.

In another preferred embodiment of the present invention, the intermediate layer 13 comprises a polymer material and a ceramic material, and the ceramic material has hydroxide ion conductivity. The intermediate layer 13 may comprise any known ceramic material having hydroxide ion conductivity. The hydroxide-ion-conductive ceramic material preferably comprises a layered double hydroxide having a fundamental composition represented by the formula: $M^{2+}_{1-x}M^{3+}_{x}(OH)_2A^{n-}_{x/n} \cdot mH_2O$ (where $M^{2+}$ represents at least one divalent cation, $M^{3+}$ represents at least one trivalent cation, $A^{n-}$ represents an n-valent anion, n is an integer of 1 or more, and x is 0.1 to 0.4). In the formula, $M^{2+}$ may represent any divalent cation, and is preferably $Ni^{2+}$, $Mg^{2+}$, $Ca^{2+}$, $Mn^{2+}$, $Fe^{2+}$, $Co^{2+}$, $Cu^{2+}$, or $Zn^{2+}$, more preferably $Ni^{2+}$. $M^{3+}$ may represent any trivalent cation, and is preferably $Fe^{3+}$, $Al^{3+}$, $Co^{3+}$, $Cr^{3+}$, or $In^{3+}$, more preferably $Fe^{3+}$. $A^{n-}$ may represent any anion, and is preferably $NO_3^-$, $CO_3^{2-}$, $SO_4^{2-}$, $OH^-$, $Cl^-$, $I^-$, $Br^-$, or $F^-$, more preferably $NO_3^-$ and/or $CO_3^{2-}$. In the formula, preferably, $M^{2+}$ comprises $Ni^{2+}$, $M^{3+}$ comprises $Fe^{3+}$, and $A^{n-}$ comprises $NO_3^-$ and/or $CO_3^{2-}$. In the formula, n is an integer of 1 or more, preferably 1 to 3; x is 0.1 to 0.4, preferably 0.2 to 0.35; and m is any real number. In another preferred embodiment of the present invention, the hydroxide-ion-conductive material may have at least one fundamental composition selected from the group consisting of hydrates of $NaCo_2O_4$, $LaFe_3Sr_3O_{10}$, $Bi_4Sr_{14}Fe_{24}O_{56}$, $NaLaTiO_4$, $RbLaNb_2O_7$, and $KLaNb_2O_7$ and $Sr_4Co_{1.6}Ti_{1.4}O_8(OH)_2 \cdot xH_2O$. These inorganic solid electrolytes are disclosed in Patent Document 7 (WO2011/108526) as hydroxide-ion-conductive solid electrolytes for fuel cells. Such a hydroxide-ion-conductive inorganic solid electrolyte can be prepared through reduction and hydration of a dense sintered compact having the aforementioned fundamental composition. The hydroxide-ion-conductive ceramic material may be used in combination with an organic binder (i.e., a polymer material). The organic binder may be any thermoplastic or thermosetting resin. Preferred examples of the organic binder include polyethylene, polypropylene, polytetrafluoroethylene (PTFE), poly(vinylidene fluoride) (PVDF), styrene-butadiene rubbers (SBR), tetrafluoroethylene-hexafluoroethylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers, (ECTFE), vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, carboxymethyl cellulose (CMC), methyl cellulose (MC), cellulose acetate phthalate (CAP), hydroxypropylmethyl cellulose (HPMC), hydroxypropylmethyl cellulose phthalate (HPMCP), poly(vinyl alcohol) (PVA), and mixtures of these resins. The hydroxide-ion-conductive ceramic material may be used in combination with the aforementioned polymer material having hydroxide ion conductivity.

The intermediate layer 13 may comprise a plurality of sublayers, and the sublayers may be composed of the same material or different materials. Thus, the intermediate layer 13 may have a single-layer structure or a multilayer structure.

The intermediate layer 13 has a thickness of preferably 1 to 200 µm, more preferably 1 to 100 µm, still more preferably 1 to 50 µm, particularly preferably 1 to 30 µm. The intermediate layer 13 having such a thickness readily improves the adhesion between the separator 11 and the air electrode layer 12 and effectively reduces the resistance of the metal-air battery (in particular, the interfacial resistance between the air electrode layer and the separator).

Metal-Air Battery

The air electrode of the present invention can be used for the preparation of a metal-air battery, in particular, a metal-air secondary battery. The metal-air battery may include the air electrode 10 of the present invention, a negative electrode containing a metal, an alloy and/or a metal compound, and an electrolytic solution, wherein the electrolytic solution is separated from the air electrode layer 12 by the separator 11 of the air electrode. The metal negative electrode may be composed of any known metal, such as zinc, lithium, aluminum, or magnesium, or an alloy of such a metal. Alternatively, the metal negative electrode may be composed of a metal compound, such as zinc oxide. The electrolytic solution may be appropriately selected from solutions having known compositions suitable for the negative electrode. The metal negative electrode may be in direct contact with the electrolytic solution. Alternatively, the metal negative electrode may be in indirect contact with the electrolytic solution such that cations (e.g., lithium ions) are conducted through a separator which allows selective permeation of the cations and does not allow permeation of the electrolytic solution, hydroxide ions and the like. Preferred examples of such a metal-air secondary battery include the zinc-air secondary battery and the lithium-air secondary battery disclosed in Patent Documents 1 and 2.

Figure 2:
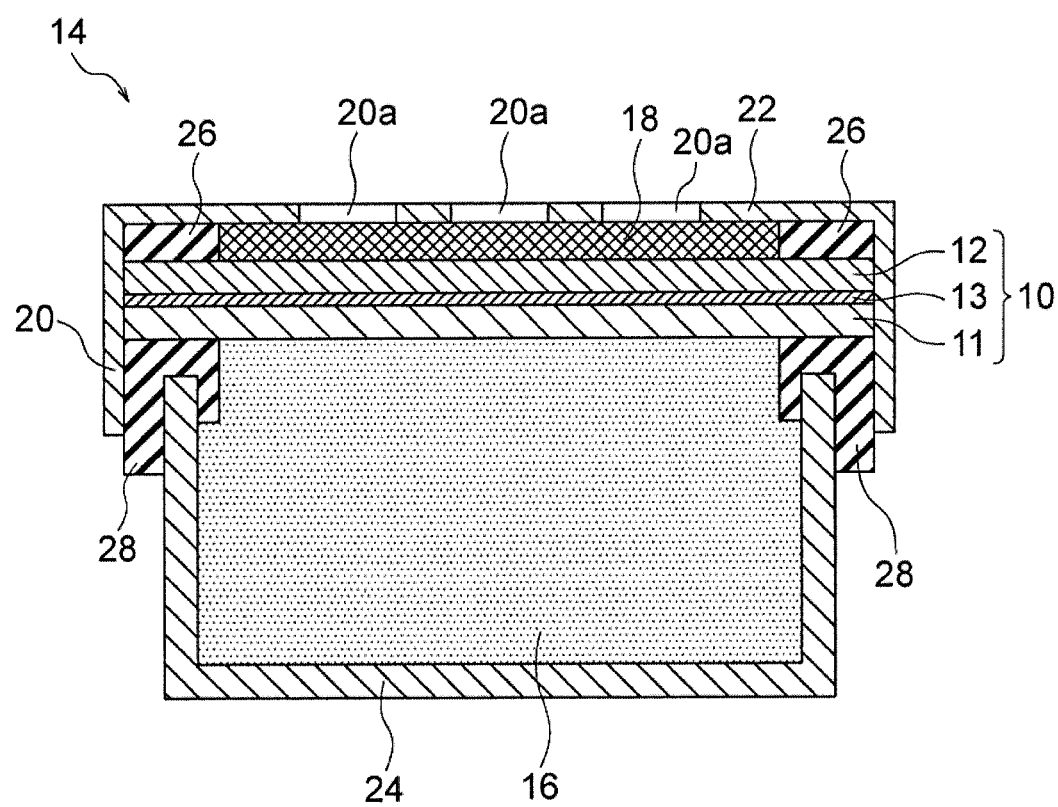
FIG. 2 is a schematic cross-sectional view of an exemplary zinc-air secondary battery including a separator-equipped air electrode of the present invention.

FIG. 2 illustrates an exemplary zinc-air secondary battery according to the present invention. The zinc-air secondary battery 14 illustrated in FIG. 2 includes a separator-equipped air electrode 10 serving as a positive electrode, a metal negative electrode 16, and an electrolytic solution. A positive-electrode current collector 18 may be disposed on the surface of the air electrode layer 12 of the separator-equipped air electrode 10. The positive-electrode current collector 18 preferably exhibits gas permeability such that air can be fed to the air electrode layer 12. Preferred examples of the positive-electrode current collector include plates and meshes of metals, such as stainless steel, copper, and nickel; carbon paper; and oxide electrical conductors. Particularly preferred is stainless steel mesh in view of corrosion resistance and gas permeability. The metal negative electrode 16 is disposed on the separator 11 of the separator-equipped air electrode 10 and contains zinc, a zinc alloy, and/or a zinc compound. The electrolytic solution is separated from the air electrode layer 12 by the separator 11. The metal negative electrode 16 is immersed in the electrolytic solution. The metal negative electrode 16 contains zinc, a zinc alloy, and/or a zinc compound serving as a negative-electrode active material. The metal negative electrode 16 may be in any form; for example, in a particulate, platy, or gel form. The metal negative electrode 16 is preferably in a particulate or gel form in view of reaction rate. The particulate metal negative electrode is preferably composed of particles having a size of 30 to 350 µm. The gel-form metal negative electrode is preferably composed of a gel prepared through agitation of a mixture containing non-amalgamated zinc alloy powder having a particle size of 100 to 300 µm, an alkaline electrolytic solution, and a thickener (gelling agent). The zinc alloy may be an amalgamated or non-amalgamated alloy containing magnesium, aluminum, lithium, bismuth, indium, or lead in any amount that ensures the desired performance of the negative-electrode active material. Preferred is a non-amalgamated zinc alloy containing neither mercury nor lead. More preferred is a zinc alloy containing aluminum, bismuth, indium, or any combination thereof. Still more preferred is a non-amalgamated zinc alloy containing 50 to 1,000 ppm bismuth, 100 to 1,000 ppm indium, and 10 to 100 ppm aluminum and/or calcium. Particularly preferred is a non-amalgamated zinc alloy containing 100 to 500 ppm bismuth, 300 to 700 ppm indium, and 20 to 50 ppm aluminum and/or calcium. Preferred examples of the zinc compound include zinc oxide. The metal negative electrode 16 may be supported on a negative-electrode current collector. Preferred examples of the negative-electrode current collector include plates and meshes of metals, such as stainless steel, copper, and nickel; carbon paper; and oxide electrical conductors. The electrolytic solution may be of any type that is commonly used in zinc-air batteries. Examples of the electrolytic solution include aqueous alkali metal hydroxide solutions, such as aqueous potassium hydroxide solutions and aqueous sodium hydroxide solutions; aqueous solutions containing zinc chloride or zinc perchlorate; non-aqueous solvents containing zinc perchlorate; and non-aqueous solvents containing zinc bis(trifluoromethylsulfonyl)imide. Preferred is an aqueous alkali metal hydroxide solution (in particular, an aqueous potassium hydroxide solution). More preferred is a 30 to 45 wt. % aqueous potassium hydroxide solution.

The separator-equipped air electrode 10, the metal negative electrode 16, and the electrolytic solution can be accommodated in a battery container 20. The battery container 20 preferably has air holes 20a for bringing the air electrode layer 12 into contact with external air. The battery container may be composed of any material and may have any shape and structure. The battery container is desirably configured to prevent the intrusion of air (in particular, carbon dioxide) into the electrolytic solution and the leakage of the electrolytic solution. For example, the battery container is preferably composed of stainless steel or resin. The battery container 20 illustrated in FIG. 2 includes a positive-electrode container 22 for accommodating at least the air electrode layer 12, and a negative-electrode container 24 for accommodating at least the metal negative electrode 16 and the electrolytic solution. The positive-electrode container 22 has air holes 20a, and thus air can reach the air electrode layer 12 through the gas-permeable current collector 18. The positive-electrode container 22 is fitted to the negative-electrode container 24 with gaskets 26 and 28 disposed between these containers. This configuration ensures the hermeticity of the battery container 20. The negative-electrode gasket 28 is disposed on the upper edge of the negative-electrode container 24 filled with the metal negative electrode 16 and the electrolytic solution. The inner diameter of the positive-electrode container 22 is greater than that of the negative-electrode container 24. Thus, the positive-electrode container 22 provided with the gasket 26 is attached to the negative-electrode container 24 provided with the gasket 28 such that the separator-equipped air electrode 10 is disposed between the gaskets 26 and 28. The gaskets 26 and 28 may be composed of any material and may have any shape and structure so long as they exhibit gas tightness and liquid tightness. The gaskets 26 and 28 are preferably composed of an insulating material, such as nylon. The containers 22 and 24 may be sealed with an adhesive in place of or together with the gaskets 26 and 28. In the battery container 20, the intrusion of air components (in particular, carbon dioxide) into the electrolytic solution in the negative-electrode container 24 can be reliably prevented with the separator-equipped air electrode 10 and the gaskets 26 and 28 or the adhesive. The zinc-air secondary battery of the present invention may be in any form; for example, a coin, button, sheet, laminate, cylindrical, flat, or rectangular form. The present invention can be applied to, for example, small secondary batteries and large secondary batteries for vehicles (e.g., electric vehicles).

Dense Layered Double Hydroxide and Preparation Thereof

As described above, the hydroxide-ion-conductive solid electrolyte usable as the separator of the air electrode of the present invention is preferably a dense layered double hydroxide. A preferred dense layered double hydroxide preferably comprises, as a main phase, a layered double hydroxide represented by the formula: $M^{2+}_{1-x}M^{3+}_x(OH)_2 A^{n-}_{x/n} \cdot mH_2O$ (where $M^{2+}$ represents at least one divalent cation, $M^{3+}$ represents at least one trivalent cation, $A^{n-}$ represents an n-valent anion, n is an integer of 1 or more, and x is 0.1 to 0.4). The dense layered double hydroxide preferably consists essentially of (or consists of) the aforementioned layered double hydroxide.

In the formula, $M^{2+}$ may represent any divalent cation, and is preferably $Mg^{2+}$, $Ca^{2+}$, or $Zn^{2+}$, more preferably $Mg^{2+}$. $M^{3+}$ may represent any trivalent cation, and is preferably $Al^{3+}$ or $Cr^{3+}$, more preferably $Al^{3+}$. $A^{n-}$ may represent any anion, and is preferably $OH^-$ or $CO_3^{2-}$. In the formula, preferably, at least $M^{2+}$ comprises $Mg^{2+}$, $M^{3+}$ comprises $Al^{3+}$, and $A^{n-}$ comprises $OH^-$ and/or $CO_3^{2-}$. In the formula, n is an integer of 1 or more, preferably 1 or 2; x is 0.1 to 0.4, preferably 0.2 to 0.35; and m is any real number.

As described above, the dense layered double hydroxide has a relative density of preferably 88% or more, more preferably 90% or more, still more preferably 94% or more. Thus, the dense layered double hydroxide preferably contains substantially no cracks, more preferably absolutely no cracks.

In the dense layered double hydroxide, the main phase of the layered double hydroxide is preferably composed of layered double hydroxide particles exhibiting no clear endothermic peak at 300° C. or lower by differential thermal analysis, for the following reasons. A clear endothermic peak observed at around 200° C. by differential thermal analysis is probably attributed to the removal of interlayer water, and the removal of interlayer water may lead to a significant structural change, such as a rapid change in interlayer distance, resulting in a narrow temperature range within which the structure is stable.

The layered double hydroxide dense body may be prepared by any method, and one preferable embodiment of the production method is described below. This production method is performed by compacting and firing a raw material powder of a layered double hydroxide represented by hydrotalcite to obtain an oxide fired body, allowing the oxide fired body to reproduce the layered double hydroxide, and then removing excessive water. According to this method, a high-grade layered double hydroxide dense body having a relative density of 88% or greater can be provided and produced in a simple and stable manner.

(1) Provision of Raw Material Powder

A powder of a layered double hydroxide represented by general formula: $M^{2+}_{1-x}M^{3+}_x(OH)_2 A^{n-}_{x/n} \cdot mH_2O$ (wherein $M^{2+}$ is a divalent cation, $M^{3+}$ is a trivalent cation, $A^{n-}$ is an anion having a valency of n, n is an integer of 1 or greater, and x is 0.1 to 0.4) is provided as a raw material powder. In the general formula above, $M^{2+}$ may be any divalent cation, and preferable examples include $Mg^{2+}$, $Ca^{2+}$, and $Zn^{2+}$, with $Mg^{2+}$ being more preferable. $M^{3+}$ may be any trivalent cation, and preferable examples include $Al^{3+}$ and $Cr^{3+}$, with $Al^{3+}$ being more preferable. $A^{n-}$ may be any anion, and preferable examples include $OH^-$ and $CO_3^{2-}$. Accordingly, it is preferable that in the general formula above, at least $M^{2+}$ comprises $Mg^{2+}$, $M^{3+}$ comprises $Al^{3+}$, and $A^{n-}$ comprises $OH^-$ and/or $CO_3^{2-}$. The value of n is an integer of 1 or greater and is preferably 1 or 2. The value of x is 0.1 to 0.4 and is preferably 0.2 to 0.35. Such a raw material powder may be a commercially available layered double hydroxide product or may be a raw material prepared by a known method such as liquid phase synthesis technique using nitrate or chloride. The particle size of the raw material powder is not limited as long as the desired layered double hydroxide dense body can be obtained, and the volume-based D50 average particle diameter is preferably 0.1 to 1.0 μm and more preferably 0.3 to 0.8 μm. This is because an excessively small particle diameter of the raw material powder is likely to result in aggregation of the powder, and it is highly possible that pores remain during compaction, while an excessively large particle diameter results in poor compactability.

Optionally, the raw material powder may be calcined to obtain an oxide powder. Although the calcination temperature at this stage is slightly different depending on the constituting $M^{2+}$ and $M^{3+}$, the calcination temperature is preferably 500° C. or less and more preferably 380 to 460° C., and calcination is performed in such a range that the particle diameter of the raw material does not largely change.

(2) Preparation of Compact

The raw material powder is compacted to obtain a compact. It is preferable that this compaction is performed by, for example, pressing such that the compact after compaction and before firing (hereinafter referred to as a compact) has a relative density of 43 to 65%, more preferably 45 to 60%, and even more preferably 47% to 58%. The relative density of the compact can be determined by calculating the density from the size and weight of the compact and dividing the density by the theoretical density, but since the weight of a compact is affected by adsorbed water, it is preferable to measure the relative density of a compact made from a raw material powder that has been stored for 24 hours or longer in a desiccator at room temperature at a relative humidity of 20% or less, or measure the relative density after storing the compact under the foregoing conditions, in order to obtain a precise value. When a raw material powder that has been calcined to form an oxide powder is used, the relative density of the compact is preferably 26 to 40% and more preferably 29 to 36%. In the case of using the oxide powder, the relative density was determined by using a calculated density obtained in terms of a mixture of oxides as a denominator, assuming that the metal elements constituting the layered double hydroxide had changed to their respective oxides due to calcination. Pressing, which is cited as an example, may be performed by metal-mold uniaxial pressing or may be performed by cold isostatic pressing (CIP). In the case of cold isostatic pressing (CIP), it is preferable to use a raw material powder that has been placed in a rubber container and vacuum-sealed or that has preliminarily compacted. In addition, the raw material powder may be compacted by a known method such as slip casting or extrusion molding, and the compacting method is not particularly limited. When a raw material powder that has been calcined to form an oxide powder is used, the compacting method is limited to dry compaction. The relative density of a compact from these methods influences not only the strength of the resulting dense body but also the degree of orientation of layered double hydroxide particles that usually have a plate shape, and it is therefore preferable to suitably adjust the relative density within the aforementioned range at the stage of compaction in consideration of, for example, the application thereof.

(3) Firing Step

The compact obtained in the foregoing step is fired to obtain an oxide fired body. It is preferable that this firing is performed such that the oxide fired body has a weight that is 57 to 65% of the weight of the compact and/or a volume that is 70 to 76% of the volume of the compact. When the weight is no less than 57% of the weight of the compact, a heterogeneous phase, from which a layered double hydroxide cannot be reproduced, is unlikely to be produced at the stage of reproduction of the layered double hydroxide, which is a subsequent step, and when the weight is no greater than 65%, firing is sufficient, and sufficient densification is achieved in a subsequent step. Also, when the volume is no less than 70% of the volume of the compact, neither a heterogeneous phase nor cracks are likely to appear at the stage of reproducing a layered double hydroxide, which is a subsequent step, and when the volume is no greater than 76%, firing is sufficient, and sufficient densification is achieved in a subsequent step. When the raw material powder that has been calcined to form an oxide powder is used, it is preferable to obtain an oxide fired body having a weight that is 85 to 95% of the weight of the compact and/or a volume that is no less than 90% of the volume of the compact. Irrespective of whether the raw material powder is calcined or not, it is preferable that firing is performed such that the oxide fired body has a relative density of 20 to 40% in terms of oxide, more preferably 20 to 35%, and even more preferably 20 to 30%. The relative density in terms of oxide is determined by using a calculated density obtained in terms of a mixture of oxides as a denominator, assuming that the metal elements constituting the layered double hydroxide have changed to their respective oxides due to firing. A preferable firing temperature for obtaining an oxide fired body is 400 to 850° C., and more preferably 700 to 800° C. It is preferable that the compact is retained at a firing temperature within this range for 1 hour or longer, and a more preferable retention time is 3 to 10 hours. In order to prevent the compact from cracking due to the release of water and carbon dioxide caused by rapid temperature increase, it is preferable to increase the temperature to the aforementioned firing temperature at a rate of 100° C./h or less, more preferably 5 to 75° C./h, and even more preferably 10 to 50° C./h. Accordingly, it is preferable to secure an overall firing time from temperature increase to temperature decrease (100° C. or less) of 20 hours or longer, more preferably 30 to 70 hours, and even more preferably 35 to 65 hours.

(4) Reproduction Step for Reproducing Layered Double Hydroxide

The oxide fired body obtained in the foregoing step is retained in or immediately above an aqueous solution comprising the above-described anion having a valency of n ($A^{n-}$) to reproduce a layered double hydroxide, thereby providing a water-rich layered double hydroxide solidified body. That is, the layered double hydroxide solidified body obtained by this production method inevitably contains excessive water. The anion contained in the aqueous solution may be the same anion as the anion contained in the raw material powder or may be a different anion. The retention of the oxide fired body in or immediately above the aqueous solution is preferably performed by a procedure of hydrothermal synthesis in a closed vessel, and an example of such a closed vessel is a closed vessel made from Teflon (registered trademark), more preferably a closed vessel equipped with a jacket made from stainless steel or the like. It is preferable that the formation of a layered double hydroxide is performed by retaining the oxide fired body at a temperature of 20° C. or greater and less than 200° C. in a state in which at least one surface of the oxide fired body is in contact with the aqueous solution, a more preferable temperature is 50 to 180° C., and an even more preferable temperature is 100 to 150° C. The oxide sintered body is retained at such a layered double hydroxide formation temperature preferably for 1 hour or longer, more preferably for 2 to 50 hours, and even more preferably for 5 to 20 hours. Such a retention time makes it possible to promote sufficient reproduction of a layered double hydroxide and avoid or reduce a remaining heterogeneous phase. An excessively long retention time does not result in any particular problem, and the retention time is suitably set in view of efficiency.

When carbon dioxide (carbonate ions) in air is intended to be used as the anionic species of the aqueous solution comprising an anion having a valency of n used for the reproduction of a layered double hydroxide, it is possible to use ion exchanged water. When performing hydrothermal treatment in a closed vessel, the oxide fired body may be immersed in the aqueous solution, or treatment may be performed in such a state that at least one surface is in contact with the aqueous solution by using a jig. In the case where treatment is performed in a state in which at least one surface is in contact with the aqueous solution, the amount of excessive water is smaller than the amount required for complete immersion, and therefore the subsequent step may be performed in a shorter period of time. However, an excessively small amount of the aqueous solution is likely to result in cracks, and it is preferable to use water in an amount greater than or equal to the weight of the fired body.

(5) Dehydration Step

Excessive water is removed from the water-rich layered double hydroxide solidified body obtained in the foregoing step. In this way, the layered double hydroxide dense body of the present invention is obtained. It is preferable that this step of removing excessive water is performed in an environment having a temperature of 300° C. or less and an estimated relative humidity at the maximum temperature in the removal step of 25% or greater. In order to prevent rapid evaporation of water from the layered double hydroxide solidified body, it is preferable to charge the solidified body again into the closed vessel used in the reproduction step for reproducing the layered double hydroxide and remove water, in the case of dehydration at a temperature higher than room temperature. A preferable temperature in this case is 50 to 250° C. and more preferably 100 to 200° C. A more preferable relative humidity at the stage of dehydration is 25 to 70% and even more preferably 40 to 60%. Dehydration may be performed at room temperature, and there is no problem as long as the relative humidity in this case is within the range of 40 to 70% in an ordinary indoor environment.

EXAMPLES

The present invention will now be described in more detail by way of Examples.

Example 1

(1) Preparation of Air Electrode Layer

Particulate α-$MnO_2$ serving as an air electrode catalyst was prepared as follows: $Mn(SO_4) \cdot 5H_2O$ and $KMnO_4$ (molar ratio=5:13) were dissolved in deionized water to prepare a mixture. The mixture was placed into a stainless steel hermetic container lined with Teflon (registered trademark) and subjected to hydrothermal synthesis at 140° C. for two hours. The precipitate produced through the hydrothermal synthesis was filtered, washed with distilled water, and then dried at 80° C. for six hours, to prepare particulate α-$MnO_2$.

A particulate layered double hydroxide (hereinafter referred to as "particulate LDH") serving as a hydroxide-ion-conductive material was prepared as follows: $Ni(NO_3)_2 \cdot 6H_2O$ and $Fe(NO_3)_3 \cdot 9H_2O$ (molar ratio, of Ni:Fe=3:1) were dissolved in deionized water to prepare a mixture. The mixture was added dropwise to a 0.3M $Na_2CO_3$ solution at 70° C. with agitation. The pH of the mixture was adjusted to 10 by addition of a 2M NaOH solution, and the mixture was maintained at 70° C. for 24 hours. The precipitate produced in the mixture was filtered, washed with distilled water, and then dried at 80° C., to prepare particulate LDH.

The particulate α-$MnO_2$, the particulate LDH, and carbon black (VXC72, manufactured by Cabot Corporation) serving as an electron-conductive material were weighed in proportions shown in Table 1 and then wet-mixed in the presence of an ethanol solvent. The resultant mixture was dried at 70° C. and then pulverized. The resultant powder was mixed with a binder (PTFE, EC-TEF-500ML, manufactured by ElectroChem) and water. The amount of water was 1 mass % relative to the air electrode. The resultant fibrillary mixture was press-bonded to a current collector (carbon cloth, EC-CC1-060T, manufactured by Electro-Chem) into a sheet having a thickness shown in Table 1, to prepare a laminate of an air electrode layer/the current collector.

(2) Preparation of Separator

Powdery hydrotalcite (DHT-6, manufactured by Kyowa Chemical Industry Co., Ltd.); i.e., a commercially available layered double hydroxide, was used as a powdery raw material. The powdery raw material had a composition of $Mg^{2+}_{0.75}Al^{3+}_{0.25}(OH)_2CO^{2-}_{3\ 0.25/n} \cdot mH_2O$. A mold having a diameter of 16 mm was filled with the powdery raw material, and the raw material was subjected to uniaxial pressing at a pressure of 500 kgf/cm², to form a compact having a relative density of 55% and a thickness of 2 mm. The relative density was measured after storage of the compact at room temperature and a relative humidity of 20% or less for 24 hours. The compact was fired in an alumina sheath. In order to prevent breakage of the compact through release of moisture and carbon dioxide by rapid heating, the compact was fired by a process involving heating of the compact at a rate of 100° C./h or less, maintenance of the compact at a maximum temperature of 750° C. for five hours, and then cooling of the compact. The total time of the firing process involving the heating, the maintenance, and the cooling (to 100° C. or lower) was 62 hours. The resultant fired product and deionized water were placed in air in a Teflon (registered trademark) hermetic container provided with an external stainless steel jacket, followed by a hydrothermal treatment process at 100° C. for five hours, to prepare a sample. The sample was cooled to room temperature, and excess water on the surface of the sample was gently wiped off with a paper filter. The resultant sample was dried in a chamber at 25° C. and a relative humidity of about 50% and then polished, to prepare a platy separator sample having a thickness of 0.5 mm.

The density of the separator sample was calculated from its dimensions and weight, and the calculated density was divided by the theoretical density of the sample to determine the relative density of the sample. The theoretical density was calculated on the basis of the theoretical density (2.06 g/cm³) of hydrotalcite (Mg/Al=3) described in JCPDS card No. 22-0700. The separator had a relative density of 95%. The crystalline phase of the separator sample was analyzed with an X-ray diffractometer (D8 ADVANCE, manufactured by Bulker AXS) at a voltage of 40 kV, a current of 40 mA, and a measuring range of 5 to 70°, and the sample was identified on the basis of the diffraction peaks of hydrotalcite described in JCPDS card No. 35-0965. Only the peaks derived from the hydrotalcite were observed.

(3) Preparation of Intermediate Layer

An anion-exchange membrane (Neosepta AHA, manufactured by ASTOM Corporation) was immersed in 1M aqueous NaOH solution overnight. The anion-exchange membrane, serving as an intermediate layer, was disposed on the separator sample, to prepare a laminate of the separator/the intermediate layer. The intermediate layer had a thickness shown in Table 1.

(4) Preparation and Evaluation of Air Electrode

Figure 3:
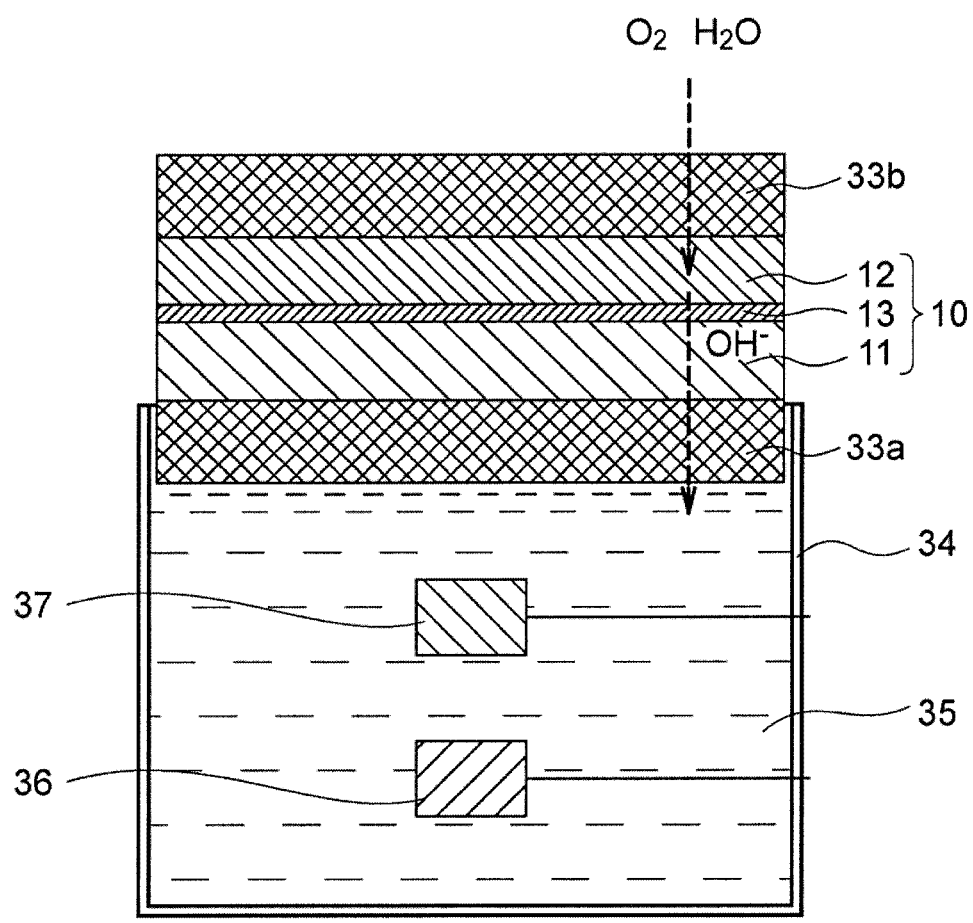
FIG. 3 is a schematic illustration of the configuration of an electrochemical measuring system used in Examples 1 to 16 for determination of overvoltage.

The air electrode layer/current collector laminate was press-bonded to the separator/intermediate layer laminate so that the air electrode layer came into contact with the intermediate layer, to prepare a separator-equipped air electrode sample. An electrochemical measuring system illustrated in FIG. 3 for determination of overvoltage was prepared for evaluation of the overvoltage characteristics in the case of application of the air electrode to a metal-air battery. Porous nickel current collectors 33a and 33b were press-bonded to lower and upper surfaces of a separator-equipped air electrode 10 (i.e., a laminate of separator 11/intermediate layer 13/air electrode layer 12), respectively. A container 34 was filled with a 1M KOH solution serving as an electrolytic solution 35, and provided with a Pt black electrode 36 (available from Inter Chemi) serving as a counter electrode and a reversible hydrogen electrode (RHE) 37 (available from Inter Chemi) serving as a reference electrode. The laminate of the current collector 33a/the separator-equipped air electrode 10/the current collector 33b was placed into the container 34 so that the electrolytic solution 35 came into contact with the separator 11 through the current collector 33a. A current (density: 100 mA/cm²) was caused to flow from the Pt black electrode 36 toward the upper current collector 33b, and the overvoltage between the reversible hydrogen electrode (RHE) 37 and the upper current collector 33b was determined with a potentio/galvanostat (Model No. 1287, manufactured by Solartron). The resistance between the separator 11 and the KOH solution was determined, and the overvoltage due to the resistance was subtracted from that between the RHE 37 and the current collector 33b, to calculate an overvoltage caused by the air electrode layer 12. Subsequently, a current was caused to flow in the reverse direction, and an overvoltage caused by the air electrode during a charge mode was determined as described above. The resultant overvoltage was evaluated on the basis of the following criteria (two ratings).

<Evaluation of Overvoltage by Air Electrode Layer at 100 mA/Cm$^2$>
A: an overvoltage of less than 1.0 V
B: an overvoltage of 1.0 V or more As described above, the overvoltage is regarded as being caused only "by the air electrode layer" for the sake of convenience. In a precise sense, the overvoltage is caused by a laminate of the air electrode layer 12 and the intermediate layer 13 in the case of Example 1; i.e., the air electrode including the air electrode layer 12 disposed on the intermediate layer 13 (the same shall apply to Examples 2 to 7 and 9 and 15; i.e., the air electrode having the same layer configuration as in Example 1).

Example 2

A separator-equipped air electrode was prepared and evaluated as in Example 1, except that an intermediate layer was prepared as described below. The results of evaluation are illustrated in Table 1. For the preparation of the intermediate layer, an anion-exchange membrane (Neosepta AHA, manufactured by ASTOM Corporation) was immersed in 1M aqueous NaOH solution overnight, both surfaces of the anion-exchange membrane were coated with styrene-butadiene rubber (SBR) (TRD2001, manufactured by JSR Corporation) so as to achieve a mass proportion shown in Table 1, and the SBR-coated anion-exchange membrane was disposed on the separator sample.

Example 3

A separator-equipped air electrode was prepared and evaluated as in Example 1, except that an intermediate layer was prepared as described below. The results of evaluation are illustrated in Table 1. For the preparation of the intermediate layer, an aqueous dispersion of a polymer having a hydrocarbon main chain and a quaternary ammonium group was applied onto the separator sample.

Example 4

A separator-equipped air electrode was prepared and evaluated as in Example 1, except that an intermediate layer was prepared as described below. The results of evaluation are illustrated in Table 1. For the preparation of the intermediate layer, an aqueous dispersion of a polymer having a hydrocarbon main chain and a quaternary ammonium group was mixed with an aqueous solution of styrene-butadiene rubber (SBR) (TRD2001, manufactured by JSR Corporation) so as to achieve a mass proportion shown in Table 1, and the resultant mixture was applied onto the separator sample.

Example 5

A separator-equipped air electrode was prepared and evaluated as in Example 1, except that an intermediate layer was prepared as described below. The results of evaluation are illustrated in Table 1. For the preparation of the intermediate layer, particulate LDH prepared through the same procedure as described in (1) of Example 1 was mixed with an aqueous solution of styrene-butadiene rubber (SBR) (TRD2001, manufactured by JSR Corporation) so as to achieve a mass proportion shown in Table 1, and the resultant mixture was applied onto the separator sample.

Example 6

A separator-equipped air electrode was prepared and evaluated as in Example 1, except that an intermediate layer was prepared as described below. The results of evaluation are illustrated in Table 1. For the preparation of the intermediate layer, particulate LDH prepared through the same procedure as described in (1) of Example 1 was mixed with an aqueous dispersion of a polymer having a hydrocarbon main chain and a quaternary ammonium group so as to achieve a mass proportion shown in Table 1, and the resultant mixture was applied onto the separator sample.

Example 7

A separator-equipped air electrode was prepared and evaluated as in Example 1, except that an intermediate layer was prepared as described below. The results of evaluation are illustrated in Table 1. For the preparation of the intermediate layer, particulate LDH prepared through the same procedure as described in (1) of Example 1 was mixed with an aqueous dispersion of a polymer having a hydrocarbon main chain and a quaternary ammonium group so as to achieve a mass proportion shown in Table 1, the mixture was mixed with an aqueous solution of styrene-butadiene rubber (SBR) (TRD2001, manufactured by JSR Corporation) so as to achieve a mass proportion shown in Table 1, and the resultant mixture was applied onto the separator sample.

Example 8 (Comparative)

A separator-equipped air electrode was prepared and evaluated as in Example 1, except that an intermediate layer was not provided. The results of evaluation are illustrated in Table 1.

Results

The results illustrated in Table 1 indicate that the separator-equipped air electrode including the intermediate layer according to the present invention (Examples 1 to 7) exhibits a lower overvoltage (caused by the air electrode layer) than the separator-equipped air electrode including no intermediate layer (Example 8). The results demonstrate that the presence of the intermediate layer disposed between the air electrode layer and the separator reduces the resistance of a metal-air battery (in particular, the interfacial resistance between the air electrode layer and the separator).

TABLE 1

| | Air electrode layer | | | | | Intermediate layer | | | | Evaluation of overvoltage [V] by air electrode at 100 mA/cm$^2$ | |
|---|---|---|---|---|---|---|---|---|---|---|---|
| | Electron-conductive | | OH$^-$-conductive | | | OH$^-$-conductive | | | | A: less than 1.0 V B: 1.0 V or more | |
| Ex. | phase | Catalyst | phase | Binder phase | Thickness (μm) | phase | Binder phase | Thickness (μm) | Separator | Discharge mode | Charge mode |
| 1 | Carbon black | αMnO$_2$ (5%) | Ni—Fe LDH (70%) | PTFE (5%) | 50 | Anion-exchange membrane (100%) | — | 30 | LDH dense | A | A |

TABLE 1-continued

| | Air electrode layer | | | | | Intermediate layer | | | | Evaluation of overvoltage [V] by air electrode at 100 mA/cm² A: less than 1.0 V B: 1.0 V or more | |
|---|---|---|---|---|---|---|---|---|---|---|---|
| Ex. | Electron-conductive phase | Catalyst phase | OH⁻-conductive phase | Binder phase | Thickness (μm) | OH⁻-conductive phase | Binder phase | Thickness (μm) | Separator | Discharge mode | Charge mode |
| 2 | (20%) | | | | 50 | Anion-exchange membrane (90%) | SBR (10%) | 30 | body | A | A |
| 3 | | | | | 50 | OH⁻-conductive polymer (100%) | — | 30 | | A | A |
| 4 | | | | | 50 | OH⁻-conductive polymer (90%) | SBR (10%) | 30 | | A | A |
| 5 | | | | | 50 | Ni—Fe LDH (90%) | SBR (10%) | 30 | | A | A |
| 6 | | | | | 50 | Ni—Fe LDH (50%) OH⁻-conductive polymer (50%) | — | 30 | | A | A |
| 7 | | | | | 50 | Ni—Fe LDH (45%) OH⁻-conductive polymer (45%) | SBR (10%) | 30 | | A | A |
| 8* | | | | | 50 | No intermediate layer | | | | B | B |

("%" indicates vol %)
Note 1)
*corresponds to Comparative Example.
Note 2)
OH⁻-conductive polymer has a hydrocarbon main chain and a quaternary ammonium group.

Example 9

A separator-equipped air electrode was prepared and evaluated as in Example 1, except that an air electrode layer was prepared to have a composition shown in Table 2 without the use of the particulate LDH. The results of evaluation are illustrated in Table 2.

Example 10

A separator-equipped air electrode was prepared and evaluated as in Example 2, except that an air electrode layer was prepared to have a composition shown in Table 2 without the use of the particulate LDH. The results of evaluation are illustrated in Table 2.

Example 11

A separator-equipped air electrode was prepared and evaluated as in Example 3, except that an air electrode layer was prepared to have a composition shown in Table 2 without the use of the particulate LDH. The results of evaluation are illustrated in Table 2.

Example 12

A separator-equipped air electrode was prepared and evaluated as in Example 4, except that an air electrode layer was prepared to have a composition shown in Table 2 without the use of the particulate LDH. The results of evaluation are illustrated in Table 2.

Example 13

A separator-equipped air electrode was prepared and evaluated as in Example 5, except that an air electrode layer was prepared to have a composition shown in Table 2 without the use of the particulate LDH. The results of evaluation are illustrated in Table 2.

Example 14

A separator-equipped air electrode was prepared and evaluated as in Example 6, except that an air electrode layer was prepared to have a composition shown in Table 2 without the use of the particulate LDH. The results of evaluation are illustrated in Table 2.

Example 15

A separator-equipped air electrode was prepared and evaluated as in Example 7, except that an air electrode layer was prepared to have a composition shown in Table 2 without the use of the particulate LDH. The results of evaluation are illustrated in Table 2.

Example 16 (Comparative)

A separator-equipped air electrode was prepared and evaluated as in Example 8 (Comparative), except that an air electrode layer was prepared to have a composition shown in Table 2 without the use of the particulate LDH. In other words, a separator-equipped air electrode was prepared and evaluated as in Example 9, except that an intermediate layer was not provided. The results of evaluation are illustrated in Table 2.

Results

The results illustrated in Table 2 indicate that the separator-equipped air electrode including the intermediate layer according to the present invention (Examples 9 to 15) exhibits a lower overvoltage (caused by the air electrode layer) than the separator-equipped air electrode including no intermediate layer (Example 16). The results demonstrate that the presence of the intermediate layer disposed between the air electrode layer and the separator reduces the resistance of a metal-air battery (in particular, the interfacial resistance between the air electrode layer and the separator).

TABLE 2

| | Air electrode layer | | | | | Intermediate layer | | | | Evaluation of overvoltage [V] by air electrode at 100 mA/cm² A: less than 1.0 V B: 1.0 V or more | |
|---|---|---|---|---|---|---|---|---|---|---|---|
| Ex. | Electron-conductive phase | Catalyst phase | OH⁻-conductive phase | Binder phase | Thickness (μm) | OH⁻-conductive phase | Binder phase | Thickness (μm) | Separator | Discharge mode | Charge mode |
| 9 | Carbon black (76%) | αMnO₂ (19%) | None | PTFE (5%) | 50 | Anion-exchange membrane (100%) | — | 30 | LDH dense body | A | A |
| 10 | | | | | 50 | Anion-exchange membrane (90%) | SBR (10%) | 30 | | A | A |
| 11 | | | | | 50 | OH⁻-conductive polymer (100%) | — | 30 | | A | A |
| 12 | | | | | 50 | OH⁻-conductive polymer (90%) | SBR (10%) | 30 | | A | A |
| 13 | | | | | 50 | Ni—Fe LDH (90%) | SBR (10%) | 30 | | A | A |
| 14 | | | | | 50 | Ni—Fe LDH (50%) OH⁻-conductive polymer (50%) | — | 30 | | A | A |
| 15 | | | | | 50 | Ni—Fe LDH (45%) OH⁻-conductive polymer (45%) | SBR (10%) | 30 | | A | A |
| 16* | | | | | 50 | No intermediate layer | | | | B | B |

("%" indicates vol %)
Note 1)
*corresponds to Comparative Example.
Note 2)
OH⁻-conductive polymer has a hydrocarbon main chain and a quaternary ammonium group.

What is claimed is:

1. A separator-equipped air electrode for a metal-air battery, the separator-equipped air electrode comprising:
    a separator comprising a hydroxide-ion-conductive inorganic solid electrolyte being a dense ceramic material;
    an air electrode layer disposed above the separator, the air electrode layer comprising an air electrode catalyst and an electron-conductive material, or comprising an air electrode catalyst also serving as an electron-conductive material; and
    an intermediate layer disposed between the separator and the air electrode layer, improving the adhesion between the separator and the air electrode layer, and exhibiting hydroxide ion conductivity,
    wherein the intermediate layer comprises a polymer material and a ceramic material, and the ceramic material contained in the intermediate layer has hydroxide ion conductivity.

2. The separator-equipped air electrode according to claim 1, wherein the polymer material has hydroxide ion conductivity.

3. The separator-equipped air electrode according to claim 1, wherein the polymer material comprises a solid polymer electrolyte having hydroxide ion conductivity.

4. The separator-equipped air electrode according to claim 3, wherein the solid polymer electrolyte is an ionomer resin.

5. The separator-equipped air electrode according to claim 1, wherein the polymer material is an organic binder.

6. The separator-equipped air electrode according to claim 1, wherein the intermediate layer comprises a plurality of sublayers, and the sublayers are composed of the same material or different materials.

7. The separator-equipped air electrode according to claim 1, wherein the air electrode layer further comprises a hydroxide-ion-conductive material.

8. The separator-equipped air electrode according to claim 1, wherein the hydroxide-ion-conductive inorganic solid electrolyte has a relative density of 88% or more.

9. The separator-equipped air electrode according to claim 1, wherein the hydroxide-ion-conductive inorganic solid electrolyte is a layered double hydroxide densified by a hydrothermal process.

10. The separator-equipped air electrode according to claim 1, wherein the hydroxide-ion-conductive inorganic solid electrolyte comprises a layered double hydroxide having a fundamental composition represented by the following formula:

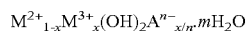

$$M^{2+}{}_{1-x}M^{3+}{}_{x}(OH)_2A^{n-}{}_{x/n} \cdot mH_2O$$

where $M^{2+}$ represents at least one divalent cation, $M^{3+}$ represents at least one trivalent cation, $A^{n-}$ represents an n-valent anion, n is an integer of 1 or more, and x is 0.1 to 0.4.

11. The separator-equipped air electrode according to claim 10, wherein $M^{2+}$ comprises $Mg^{2+}$, $M^{3+}$ comprises $Al^{3+}$, and $A^{n-}$ comprises $CO_3^{2-}$.

12. A metal-air battery comprising:
    the separator-equipped air electrode according to claim 1;
    a negative electrode comprising a metal, an alloy, and/or a metal compound; and
    an electrolytic solution, wherein the electrolytic solution is separated from the air electrode layer by the separator of the air electrode.

* * * * *